United States Patent
Chiang

(10) Patent No.: US 6,883,818 B1
(45) Date of Patent: Apr. 26, 2005

(54) BICYCLE HEADSET ASSEMBLY

(76) Inventor: Douglas Chiang, No. 487, Ko-Chung Rd., Ta-Li City, Taichung Hsien (TW)

( * ) Notice: Subject to any disclaimer, the term of this patent is extended or adjusted under 35 U.S.C. 154(b) by 0 days.

(21) Appl. No.: 10/695,986

(22) Filed: Oct. 30, 2003

(51) Int. Cl.[7] .......................................... B62K 21/06
(52) U.S. Cl. .................................... 280/279; 384/538
(58) Field of Search ............................. 280/279, 280; 74/551.1; 384/538, 546; 403/371

(56) References Cited

U.S. PATENT DOCUMENTS

| | | | |
|---|---|---|---|
| 4,531,756 A | * 7/1985 | Mori | 280/279 |
| 5,251,995 A | * 10/1993 | Chi | 403/320 |
| 5,680,798 A | * 10/1997 | Luen | 74/551.1 |
| 5,681,119 A | * 10/1997 | Marui | 384/545 |
| 5,775,709 A | * 7/1998 | Chen | 280/279 |
| 5,893,574 A | * 4/1999 | Campagnolo | 280/279 |
| 5,964,474 A | * 10/1999 | Chen | 280/279 |
| 6,254,115 B1 | * 7/2001 | Lin | 280/279 |
| 6,651,525 B1 | * 11/2003 | Jiang | 74/551.1 |

FOREIGN PATENT DOCUMENTS

FR 2629784 * 10/1989

* cited by examiner

Primary Examiner—Anne Marie Boehler

(57) ABSTRACT

A bicycle headset assembly is mounted to a steering tube extending through a head tube of the bicycle. The headset assembly includes a race connected to a top end of the bicycle head tube and a bearing set is engaged with an inner periphery of the race. A positioning ring is engaged with an inner periphery of the bearing set and mounted on the steering tube. A cap is mounted to the race and presses the positioning ring. A pressing ring is mount to the steering tube and presses on a top surface of the cap by the handlebar stem.

4 Claims, 2 Drawing Sheets

BICYCLE HEADSET ASSEMBLY

FIELD OF THE INVENTION

The present invention relates to a headset assembly for bicycles and the headset assembly includes a threaded race engaged with the head tube and a cap is threadedly connected to the threaded race with the bearing received therein.

BACKGROUND OF THE INVENTION

A conventional non-threaded bicycle headset assembly generally includes a steering tube which has smooth outer surface and extends through a head tube of the bicycle. The headset assembly is connected on each of two ends of the head tube and the steering tube rotatably extends through the headset assembly such that the steering tube can be rotated relative to the head tube by the headset assembly. A pressing member is mounted to a top end of the steering tube and an urging unit is forced fitting in the steering tube. A bolt is connected to the urging unit and a head of the bolt is engaged with a top end of the pressing member such that when rotating the bolt, the urging unit expands outward to securely connect the steering tube to the pressing member which is then moved downward to press on the headset assembly to position the bearing in the headset assembly.

Nevertheless, a special tool is required to hammer the urging unit into the steering tube and this takes a lot of time. Frequently, the urging unit is not forced into the steering tube as expected and this could affect the positioning of the headset assembly. Once the urging unit is deformed because of the hammering, it is difficult to take it out and this affects the time required when the headset assembly needs to be replaced with a new one.

The present invention intends to provide a simple structure of the headset assembly which is easily to be assembled to the head tube and the steering tube.

SUMMARY OF THE INVENTION

The present invention relates to a bicycle headset assembly which includes a race connected to a top end of the bicycle head tube and a bearing set is engaged with an inner periphery of the race. A positioning ring is engaged with an inner periphery of the bearing set and mounted on the steering tube which extends through the head tube. A cap is connected to the race and presses the positioning ring. A pressing ring is mount to the steering tube and presses on a top surface of the cap.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
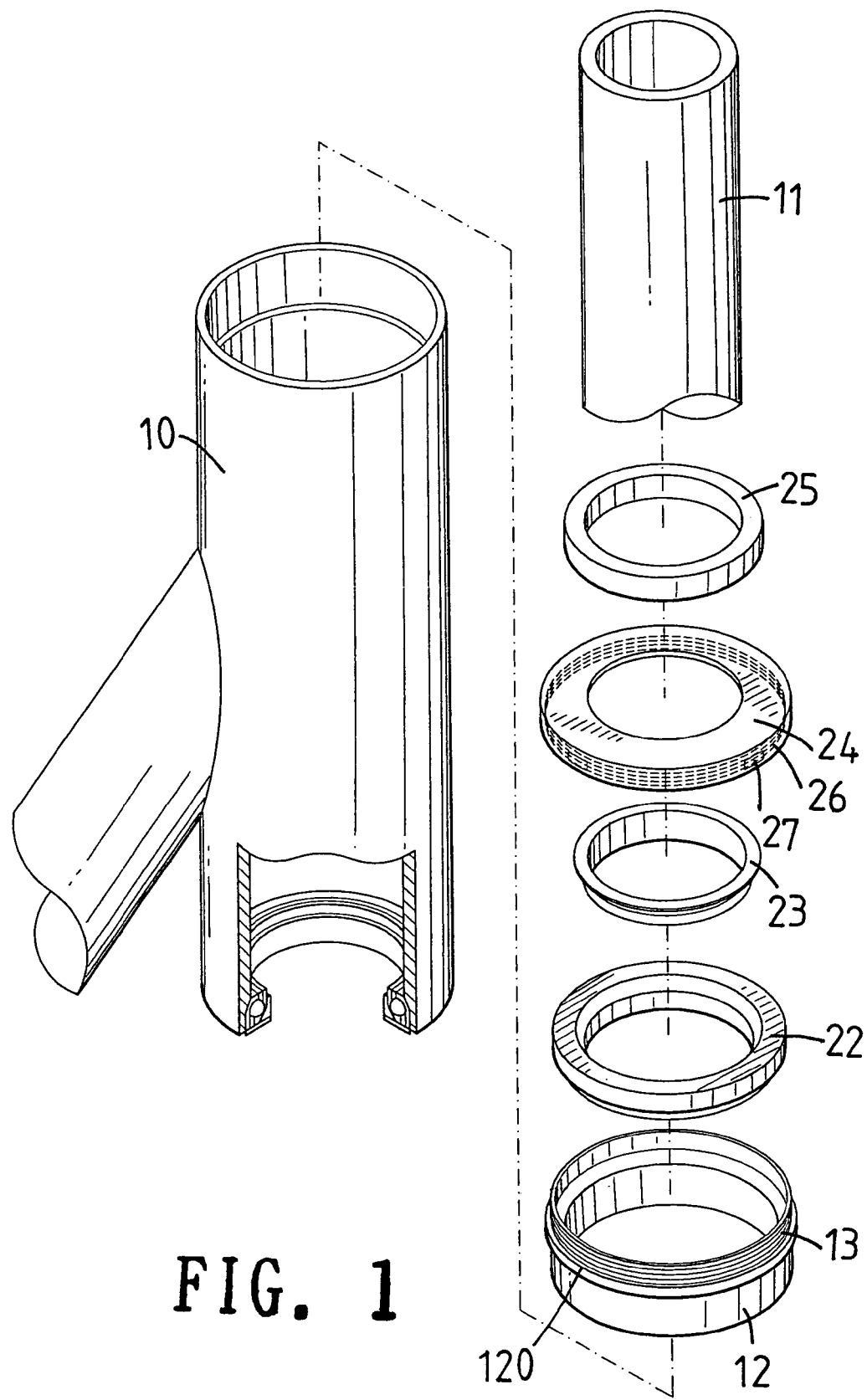
FIG. 1 is an exploded view to show the headset assembly of the present invention.
Figures 2, 3:
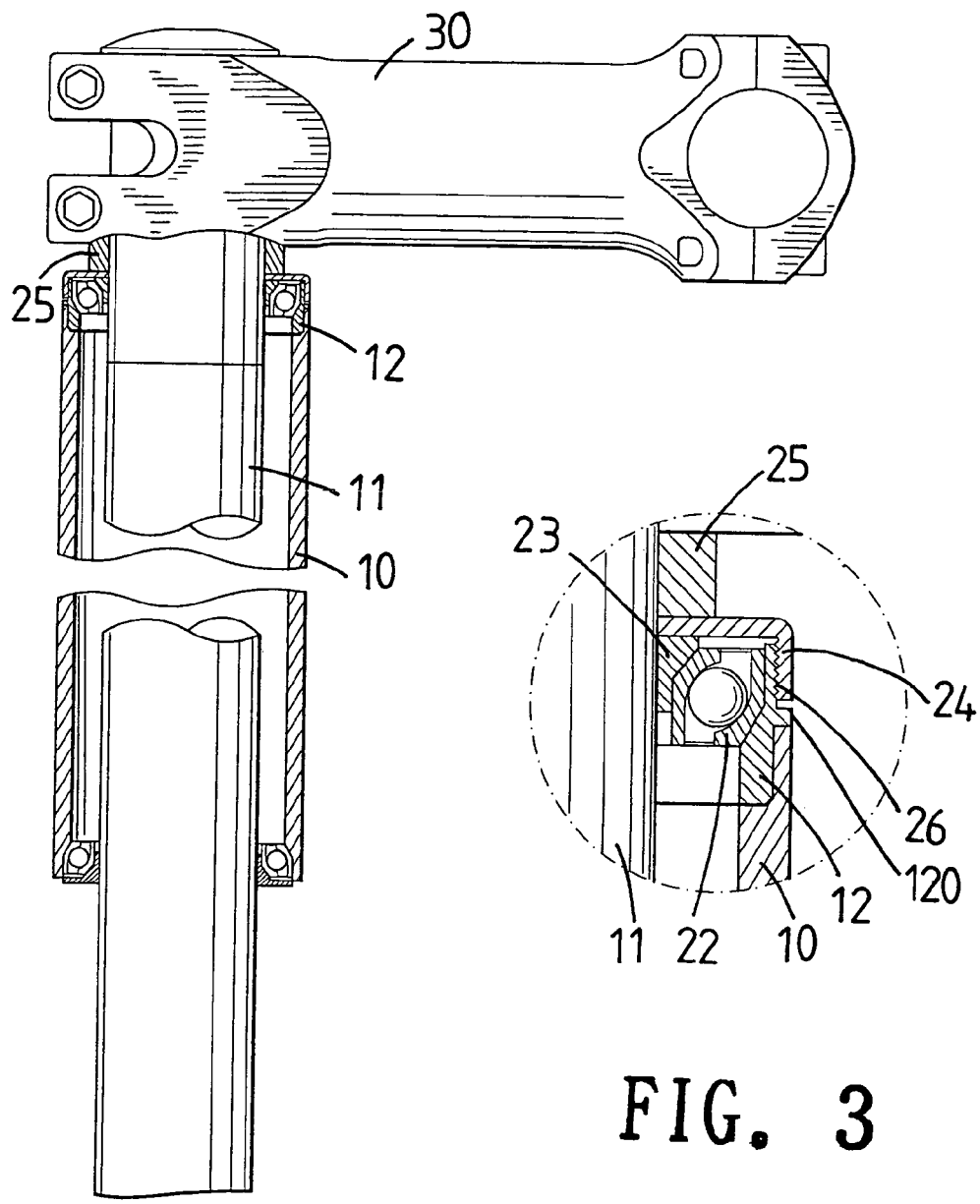
FIG. 2 shows the headset assembly connected to the head tube and the steering tube, and a handlebar stem is connected to the steering tube.
FIG. 3 is an enlarged view to show the headset assembly of the present invention.

Referring to FIGS. 1 to 3, the bicycle headset assembly of the present invention comprises a race 12 which is connected to a top end of the bicycle head tube 10 and has a threaded outer periphery 13. A flange 120 extends outward from the outer surface of the race 12 so as to be rested on the top end of the head tube 10.

A bearing set 22 has a tapered outer periphery which is engaged with a tapered inner periphery of the race 12 and a positioning ring 23 is engaged with a tapered inner periphery of the bearing set 22. The positioning ring 23 is mounted on the steering tube 11 which extends through the head tube 10. A cap 24 has a threaded inner periphery 26 which is connected to the threaded outer periphery 13 of the race 12 and pressing the positioning ring 23.

A pressing ring 25 is mount to the steering tube 11 extending beyond the top end of the head tube 10 and presses on a top surface of the cap 24. A handlebar stem 30 is fixed to the steering tube 11 by extending two bolts through two lugs on the handlebar stem 30. The pressing ring 25 is pressed by the handlebar stem 30. The cap 24 includes at least two flat surfaces 27 on an outer periphery thereof so that the user can tighten or loosen the cap 24 by clamping the at least two flat surfaces 27 with a wrench.

The structure of the headset assembly includes less number of parts which are easily to be assembled such that the headset assembly is reliable and easily to be maintained.

While we have shown and described the embodiment in accordance with the present invention, it should be clear to those skilled in the art that further embodiments may be made without departing from the scope of the present invention.

What is claimed is:

1. A bicycle headset assembly mounted to a steering tube extending through a head tube, the headset assembly comprising:

a race adapted to be connected to a top end of the bicycle head tube and a bearing set engaged with an inner periphery of the race, a positioning ring engaged with an inner periphery of the bearing set and the positioning ring adapted to be mounted on the steering tube, the race having a threaded outer periphery, and a cap having a threaded inner periphery which is connected to the threaded outer periphery of the race, the cap pressing the positioning ring.

2. The headset assembly as claimed in claim 1, wherein the race includes a flange which is adapted to be rested on the top end of the head tube.

3. The headset assembly as claimed in claim 1, wherein the cap includes at least two flat surfaces on an outer periphery thereof.

4. The headset assembly as claimed in claim 1 further comprising a pressing ring adapted to mount to the steering tube and pressing on a top surface of the cap.

* * * * *